(12) United States Patent
Petzold et al.

(10) Patent No.: US 7,878,084 B2
(45) Date of Patent: Feb. 1, 2011

(54) METHOD FOR DETERMINING THE POSITION OF A SHIFTING ELEMENT

(75) Inventors: Rainer Petzold, Friedrichshafen (DE); Robert Ingenbleek, Kressbronn (DE); Mario Steinborn, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 909 days.

(21) Appl. No.: 11/788,483

(22) Filed: Apr. 20, 2007

(65) Prior Publication Data
US 2007/0245842 A1 Oct. 25, 2007

(30) Foreign Application Priority Data
Apr. 20, 2006 (DE) .................. 10 2006 018 313

(51) Int. Cl.
*F16H 59/00* (2006.01)

(52) U.S. Cl. ........................... 74/335; 701/64

(58) Field of Classification Search ................. 74/335, 74/339; 701/64
See application file for complete search history.

(56) References Cited

U.S. PATENT DOCUMENTS

| 4,646,556 A | 3/1987 | Courcoux et al. |
| 5,829,335 A | 11/1998 | Ewald et al. |
| 5,832,777 A | 11/1998 | Weilant |
| 6,532,980 B1 | 3/2003 | Langeveld |
| 6,591,704 B2 * | 7/2003 | Kamiya et al. ................. 74/335 |
| 6,694,803 B2 | 2/2004 | Klik et al. |
| 6,705,175 B1 | 3/2004 | Klatt |
| 7,540,211 B2 * | 6/2009 | Otsubo ..................... 74/336 R |

FOREIGN PATENT DOCUMENTS

| DE | 195 13 032 C1 | 8/1996 |
| DE | 197 31 842 A1 | 1/1998 |
| DE | 199 18 164 A1 | 10/2000 |
| DE | 199 31 973 A1 | 1/2001 |
| DE | 101 31 853 A1 | 1/2003 |
| DE | 103 36 971 B3 | 10/2004 |
| EP | 0 723 097 A2 | 7/1996 |
| EP | 1 067 319 A2 | 1/2001 |
| GB | 2 315 526 A | 2/1998 |

* cited by examiner

*Primary Examiner*—David D Le
*Assistant Examiner*—Derek D Knight
(74) *Attorney, Agent, or Firm*—Davis & Bujold, P.L.L.C.

(57) ABSTRACT

A method for determining the position of a shifting element (11), for example of a sliding sleeve in an automatic transmission of a motor vehicle, with the element actuated by way an actuating element, for example comprising a shifting rod (8) and a shifting fork (10), via an operating element (1). From the actuating pressure and/or the shifting force of the operating element, deformation of the actuating element, for example the shifting rod (8) and/or the shifting fork (10), is determined which result in the position of the shifting element being determined with greater precision.

3 Claims, 1 Drawing Sheet

METHOD FOR DETERMINING THE POSITION OF A SHIFTING ELEMENT

This application claims priority from German Application Serial No. 10 2006 018 313.4 filed Apr. 20, 2006.

FIELD OF THE INVENTION

The invention relates to a method for determining the position of a shifting element, for example in a motor vehicle.

BACKGROUND OF THE INVENTION

The main components of automatic transmissions are conventional, as are manually operated gear mechanisms, wherein the shifting and/or starting clutch between the driving motor and transmission, as well as the selection and shifting of gears, are actuated automatically using corresponding operating elements. These operating elements are typically configured as hydraulic or pneumatic actuating cylinders or as electric actuators, which act upon actuating elements for the above gear functions. The actuating elements can be provided on or in the transmission.

For the actuation of hydraulic or pneumatic operating elements, pressure-generating and control devices are required which, according to the state of the art, comprise a hydraulic or pneumatic pump as the pressure-generating device, a pressure accumulator, a hydraulic or pneumatic control unit with control valves and sensors, which are connected to a central control and regulating device and can be actuated by the same, based on control and regulating functions stored there.

In variable speed gear wheel transmissions configured as constant-mesh countershaft transmissions, the torque-transmitting connection of two gear elements is established by clutch gearing. In the case of such constant-mesh countershaft transmissions, at least part of the running gears are permanently engaged and the spur gears are connected to the shafts by sliding sleeves, via claw-type involute splines, which are provided laterally on the spur gears. To facilitate shifting, the claws are supplemented with synchronization and locking synchronization devices. The synchronization devices provide rotational speed adjustment of two gear elements rotating at different speeds and of the parts connected thereto, so that they can be connected to each other without any grating noise. Known synchronization devices comprise locking devices, which are not released until the gear elements to be connected have synchronous speeds and allow the form-fit connection of the gear elements to be connected. Locking devices of this type prevent grating noise and damage to the form-fit shifting elements.

The disadvantage is that actuating elements, such as shifting rods or shifting forks, may bend to a certain degree due to the forces occurring during a gear shift, so that ultimately the position of the shifting fork located on the shifting fork base does not correspond to the precise position of the sliding sleeve. Due to the high stress applied on transmissions, which results in strain or bending of the transmission shafts, the shifting forks are frequently not in contact with the sliding sleeves across the entire circumference of the sliding sleeves thus allowing jamming between the shifting fork and sliding sleeve. This measure, however, lowers the rigidity of the shifting fork and thus increases the bending tendency of the shifting fork.

DE 103 36 971 B3 discloses an arrangement for determining the position of a gearshift fork or gear lever, according to which a precise displacement signal can be achieved for adjusting the sliding sleeve actuated by a gearshift fork. Due to the fact that a position transmitter is located basically at the end of the gearshift fork, possible deflections of the gearshift fork are compensated for so that a transmitter-sensor unit can precisely determine the position of the sliding sleeve provided on the gear shaft. For an advantageously, contact-free position determination of the gearshift fork, a magnet is provided as the position transmitter, while the sensor provided at a distance to the same or in the transmission housing is configured as a magnetic sensor. To attach or accommodate the magnet, a protrusion is envisaged on one of the two ends of the gearshift fork with the protrusion advantageously formed from the gearshift fork. The magnet is, in turn, accommodated in an element, which is attached on the protrusion. Since the sensor is accommodated in a separate housing, which is inserted in an opening of the transmission housing, inclinations in the transmission housing can be compensated for to allow the necessary horizontal orientation.

The disadvantages of the state of the art are that separate position transmitters and sensors must be provided on the shifting fork and/or the transmission housing to allow precise determination of the position of the sliding sleeve, requiring additional devices, which increases the number of components and thus the costs.

It is, therefore, the object of the invention to provide a method which allows precise determination of the position of a shifting element, for example of a motor vehicle, and eliminates the disadvantages of the state of the art.

The underlying goal of the invention is achieved with a method of this type for determining the position of a shifting element.

SUMMARY OF THE INVENTION

In motor vehicles, the selection and shifting of gears, as well as the actuation of the shifting clutch and/or starting clutch between the driving motor and the transmission, are accomplished with operating elements. These operating elements can be configured, for example, as actuating cylinders, actuated by way of a pressurized agent. When a pressurized agent is applied to the pressure chambers of such actuating cylinders, corresponding shifting forces develop in these pressure chambers. These shifting forces, in turn, displace a piston of the actuating cylinder in the appropriate direction. As a result of the displacement of the piston, a force can be applied on an actuating element, which is connected to the actuating cylinder. These actuating elements can be configured, for example as shifting rods, which are connected to sliding sleeves, via shifting forks. Through the axial displacement of the shifting rods and thus of the sliding sleeves, by the actuating cylinder, a shift of a gear ratio in a transmission is achieved. For example, a spur gear is connected non-rotatably with a gear shaft by the sliding sleeve, via claw-like involute splines, which are located on the side of the spur gear.

During a shifting process in a transmission, the actuating elements, positioned on the actuating cylinder, such as the shifting rods or shifting forks, are deformed as a result of the shifting force of the actuating cylinder. Since a change in the displacement of an actuating cylinder can be sensed with great precision, the deformation of the actuating elements can also be very precisely determined. The change in displacement can be obtained from an existing signal, for example the signal of a displacement sensor integrated in the actuating cylinder or attached externally. Once the deformation of the actuating elements is known, the position of the sliding sleeve can be determined more accurately. For this, the actuating pressure and hence the shifting force of the operating element must be known from another device used for pressure determination, for example from a pressure sensor. The deformation of the actuating elements can be derived as a function of the actuating pressure and/or the shifting force. The greater the actuating pressure and/or the shifting force of the actuating cylinder, the greater the deformation of the actuating elements. When taking the deformation of the actuating elements into consideration, the position of the sliding sleeve can be determined more accurately.

Actual displacement of the cylinder during a shifting process consists of the nominal cylinder displacement and the displacement of the deflection of the actuating elements. The nominal cylinder displacement is the distance that the actuating cylinder travels to reliably guarantee shifting of a gear, such that the actuating elements are not deformed. The nominal cylinder displacement for shifting a gear of a transmission is a fixed value and is stored, for each actuating cylinder, in a control and regulating unit. The deformation of an actuating element increases with the shifting force of the actuating cylinder. The measurement of the difference between the nominal displacement and the travel produced by the control pressure (deformation measurement) allows a determination of the precise position of the sliding sleeve. The displacement of the deflection is obtained from the total cylinder displacement minus the nominal cylinder displacement. The known nominal cylinder displacement is used by the control and regulating unit together with the actual cylinder displacement for computation purposes. If there is no difference in displacement between the nominal displacement and the actual travel of the operating element, the position of the sliding sleeve corresponds directly to the displacement sensed by the displacement sensor, which is located either internally or externally of the operating element. When the actual cylinder displacement is greater than the nominal cylinder displacement, this difference represents a measure of the deformation of the actuating elements. When taking the deformation of the actuating elements into consideration, the exact position of the sliding sleeve can be determined.

Furthermore, it is conceivable that the deformation of the actuating elements can be detected, by way of a strain gauge, with this deformation being dependent on the shifting force of the operating element, by way of a strain gauge. When a strain gauge is deformed as a result of a deformation of an actuating element, the electric resistance of the same changes. The signal of the change in resistance can be used to determine the deformation of the actuating element and thus the precise position of the sliding sleeve.

With the method according to the invention, the deformation of the actuating element, for example the deformation of a shifting rod or a shifting fork, can be determined via the actuating pressure and/or the shifting force of the operating element. The displacement signal of the actuating cylinder can be used to determine the precise position of the sliding sleeve, when taking the deformation of the actuating element into consideration. Consequently, no separate sensors or position transmitters are required on the shifting fork and/or on the transmission housing, thus saving component costs.

BRIEF DESCRIPTION OF THE DRAWING

The invention will now be described, by way of example, with reference to the accompanying drawing in which:

The only FIGURE in this specification shows an example of a design for determining the position of a shifting device, while taking the deformation of a shifting fork into consideration.

DETAILED DESCRIPTION OF THE INVENTION

Figure 1:
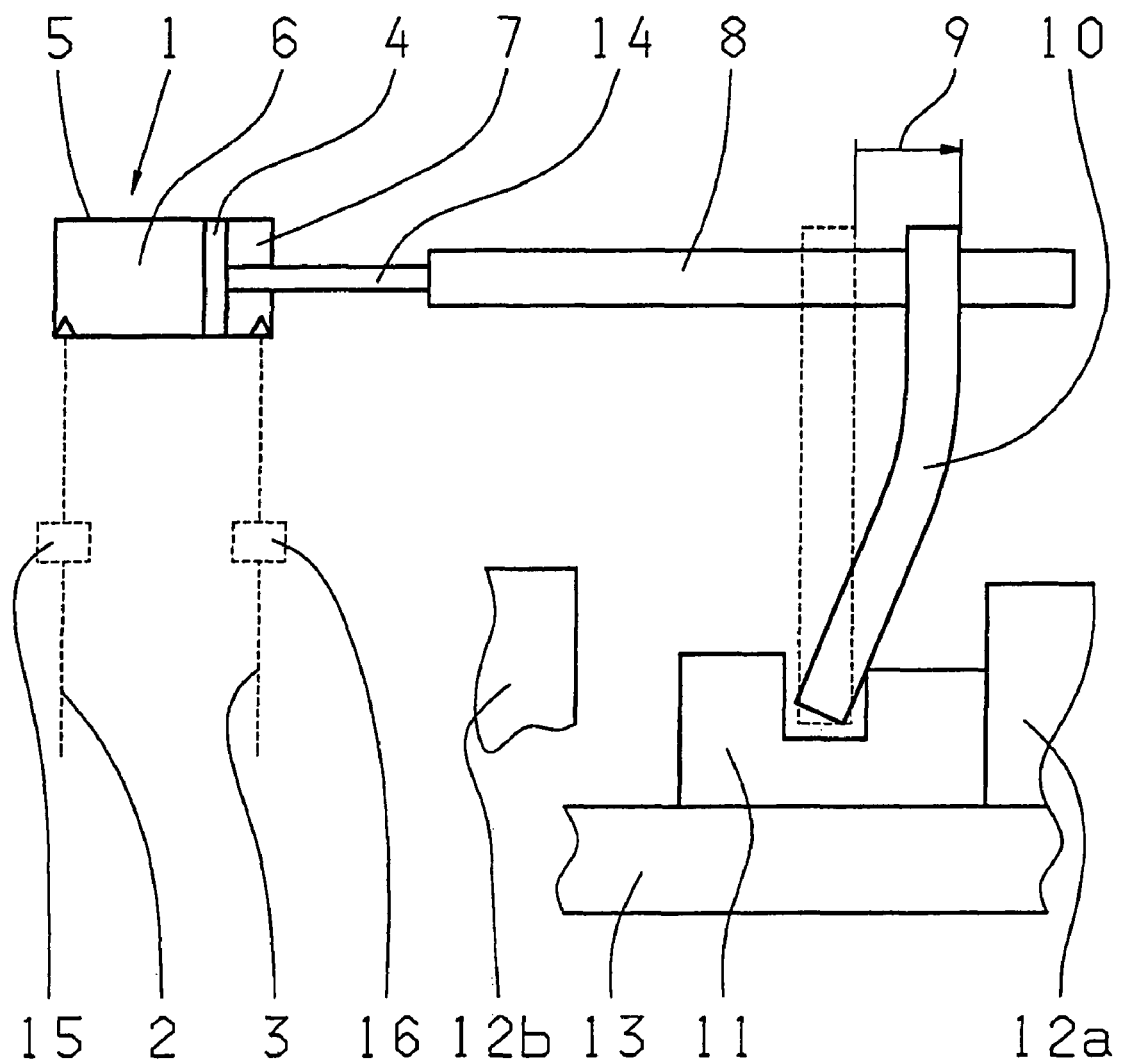

The FIGURE shows an example of a design for determining the position of a shifting element 11, for example a sliding sleeve, while taking the deformation of a shifting fork 10 into consideration. Pressurant lines 2, 3 are connected to the pressure chambers 6, 7 of an operating element 1, for example an actuating cylinder. The actuating cylinder 1 comprises a cylinder 5, a piston 4 and a piston rod 14. The piston rod 14 is connected to a shifting rod 8, on which a shifting fork 10 is located. The shifting fork 10 engages the sliding sleeve 11, which can move axially on a shaft 13, for example a gear shaft. By appropriately activating a pressure regulating device (not shown here), an appropriate control pressure is applied on the pressurant line 2, thus creating a shifting force in the pressure chamber 6 of the actuating cylinder 1. This control pressure is detected by a device for pressure determination, for example by a pressure sensor 15, allowing the shifting pressure of the actuating cylinder 1 to be determined. As a result of this control pressure and/or the shifting force in the pressure chamber 6 of the actuating cylinder 1, the piston 4 in the cylinder 5 and the piston rod 14 on the piston 4 are moved to the right in the plane of the FIGURE. The piston 4 and a piston rod 16 can also be produced from one piece. As a result of the displacement of the piston 4 and thus of the piston rod 14 to the right in the plane of the FIGURE, the shifting rod 8, the shifting fork 10 and the sliding sleeve 11 are likewise displaced to the right. The piston 4 is displaced until the clutch gearing of the sliding sleeve 11 and the clutch gearing of a spur gear 12a are non-rotatably connected to each other. This displacement corresponds to the nominal displacement of the actuating cylinder 1. When the actuating pressure in the pressure chamber 6 of the actuating cylinder 1 is greater than is required for the nominal displacement, the shifting rod 8 is displaced further to the right, resulting in a deformation of the shifting fork 10. When the nominal displacement is obtained from the total distance traveled by the piston 4, the difference 9 between the displacement of the piston 4 and the displacement of the sliding sleeve 11 is determined. This difference 9 results from the deformation of the shifting fork 10. From this difference in displacement 9, a device such as a control and regulating unit computes the precise position of the sliding sleeve 11.

The sliding sleeve 11 is actuated to the left in the plane of the FIGURE in a mirror process. An appropriate control pressure is applied on the pressurant line 3, thus creating an appropriate shifting force in the pressure chamber 7 of the actuating cylinder 1. This control pressure is detected by a pressure determination device for example by the pressure sensor 16, allowing the shifting pressure of the actuating cylinder 1 to be determined. As a result of the control pressure and/or the shifting force in the pressure chamber 7 of the actuating cylinder 1, the piston 4 in the cylinder 5 and the piston rod 14 on the piston 4 are displaced to the left in the plane of the FIGURE. The piston 4 is displaced until the clutch gearing of the sliding sleeve 11 and the clutch gearing of a spur gear 12b are non-rotatably connected to each other.

In the embodiment described above, the control pressure in the pressurant line 2 is determined by the pressure sensor 15 and the control pressure in the pressurant line 3 by the pressure sensor 16. In another embodiment, the pressure sensor 15, 16 may be arranged such that it can detect both the control pressure in the pressurant line 2 and the control pressure in the pressurant line 3. This way, one pressure sensor 16, 15 can be eliminated, saving component costs and reducing the space required for the installation of the pressure-regulating device.

REFERENCE NUMERALS 1 operating element, actuating cylinder
2 pressurant line for the operating element
3 pressurant line for the operating element
4 piston
5 cylinder
6 pressure chamber
7 pressure chamber
8 shifting rod
9 difference in displacement due to deformation
10 shifting fork
11 sliding sleeve
12a spur gear
12b spur gear
13 shaft
14 piston rod
15 pressure sensor
16 pressure sensor

The invention claimed is:

1. A method of determining a position of a shifting element (11) in an automatic transmission of a motor vehicle, the shifting element (11) being actuated by an actuating element via an operating element (1), the method comprising the steps of:

providing the operating element (1) with an actuating pressure to actuate the actuating element;

displacing the shifting element (11) by a nominal displacement to engage a gear (12a) by actuating the actuating element;

detecting a value of the actuating pressure with a sensor upon engagement of the gear (12a) and associating the value of the actuating pressure to the nominal displacement;

deforming the actuating element by further actuating and displacing the actuating element to a total displacement which is greater than the nominal displacement;

determining a deformation displacement of the actuating element by subtracting the nominal displacement from the total displacement; and computing a precise position of the shifting element (11) using the deformation displacement.

2. The method according to claim 1, further comprising the step of detecting the nominal displacement and the total displacement with a displacement sensor provided either one of internally and externally of the operating element (1).

3. A method of determining a position of a shifting element (11) in an automatic transmission of a motor vehicle, an operating element (1) communicating via an actuating element (14, 8, 10) with the shifting element (11), the method comprising the steps of:

providing the operating element (1) with an actuating pressure to actuate the actuating element (14, 8, 10);

displacing the actuating element (14, 8, 10) and the shifting element (11), upon actuation of the actuating element (14, 8, 10), to one of engage and disengage a gear (12a), the displacement of the shifting element (11), to one of engage and disengage the gear (12a), being a nominal displacement;

detecting a pressure value of the actuating pressure with a pressure sensor (15) and equating the pressure value of the actuating pressure to the nominal displacement;

deforming the actuating element (14, 8, 10) by providing the operating element (1) with an excessive actuating pressure, thus causing the actuating element (14, 8, 10) to be displaced to a total displacement which is in excess of the nominal displacement, the shifting element (11) being prohibited from displacement in excess of the nominal displacement;

determining a displacement difference value (9) between the total displacement of the actuating element (14, 8, 10) and the nominal displacement of the shifting element (11); and computing a precise position of the shifting element (11) with a control unit, using the displacement difference value (9).

* * * * *